United States Patent Office 2,833,756
Patented May 6, 1958

2,833,756
POLYAZO DYESTUFFS

Richard Fleischhauer, Frankfurt am Main-Fechenheim, Germany, assignor to Cassella Farbwerke Mainkur Aktiengesellschaft, Frankfurt am Main-Fechenheim, Germany, a company of Germany No Drawing. Application April 27, 1955
Serial No. 504,348

Claims priority, application Germany May 5, 1954

7 Claims. (Cl. 260—171)

This invention relates to new valuable polyazo dyestuffs which are especially useful for dyeing leather.

I have found that valuable polyazo dyestuffs corresponding to the general formula

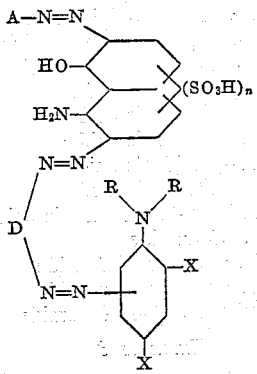

wherein A means an aromatic residue; D the residue of an aromatic diamino compound; $n$ the number 1 or 2; one X hydrogen, the other X OH or $NH_2$; R a radical of the group consisting of hydrogen, alkyl aralkyl, cycloalkyl, phenyl; and the benzene nucleus may contain further substituents, are obtained by coupling the tetrazo compound of an aromatic diamino compound (D) in an acidic medium with one mole of a 1.8-aminonaphthol-sulfonic acid, then in an alkaline medium with one mole of any diazo compound (A) and combining the diazo-disazo compound thus obtained with a 1.2- or 1.4-diamino or amino-hydroxy compound of the benzene series.

For tetrazo component (D) may be used, for example, benzidine, ortho- or meta-tolidine, dianisidine or their sulfonic acids, furthermore 4.4′-diaminostilbene-disulfonic acid, paraphenylene-diamine or its substitution products.

As a middle component may serve 1-amino-8-naphthol-3.6-disulfonic acid, 1-amino-8-naphthol-4.6-disulfonic acid, 1-amino-8-naphthol-3.5-disulfonic acid, 1-amino-8-naphthol-4-sulfonic acid.

The residue A may be of the benzene or naphthalene series and may contain substituents such as halogen atoms, nitro-, amino-, alkylamino-, arylamino-, acylamino-, alkyl- or alkoxy-groups and may furthermore contain carboxylic or sulfonic acid groups.

The polyazo dyestuffs correspond to the general formula

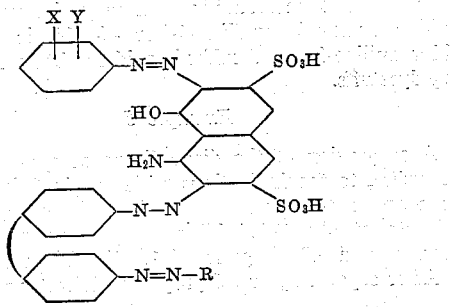

wherein X means a radical of the group consisting of hydrogen, carboxylic acid and sulfonic acid groups, Y means a radical of the group consisting of hydrogen, methyl, methoxy, chlorine and nitro and R means a radical of the group consisting of ortho- and para-phenylene diamine.

The dyestuffs obtained according to this invention may serve for the dyeing of textile materials of animal, vegetable or synthetic fibers; they are particularly suitable for the dyeing of leather to which they impart bluish black shades marked by a special bluish or greenish tint.

The new dyestuffs are distinguished from known dyestuffs containing instead of 1.2- or 1.4-diaminobenzene 1.3-diaminobenzene or its substitution products as an end component, by a substantially better resistance to alkali or acids. While the solutions of known dyestuffs from 1.3-diaminobenzenes and the dyeings produced thereof change their color intensely toward red when in contact with acids and toward green by contact with alkali, the solutions and the dyeings which are produced by the dyestuffs of the present invention do not change their shades at all under the action of acids or alkali, or do so only to a negligible extent.

On the other hand, also the known dyestuffs from 3-aminophenol change their shades, under the influence of acids, toward red while this is not true of the dyestuffs obtained according to the present invention with the use of ortho- or para-aminophenols. Since the alterations of shade present with the known dyestuffs from 1.3-diaminobenzenes or 1-amino-3-hydroxybenzenes apparently are dependent upon the amino groups, it must be considered as surprising that the dyestuffs of the present application in which the same auxochromes only stand in another position to each other do not exhibit such a strong dependence of their shades upon the pH.

In the dyeing of velvet leather or leather for clothing the dyestuffs of the present invention in many instances exhibit a better penetration than the known dyestuffs from 1.3-diaminobenzenes.

The dyestuffs of the present invention enhance the penetration of leather dyestuffs insufficient in penetration. Because of this valuable property it is possible to use the dyestuffs of this invention as components in mixtures of dyestuffs of a similar composition which are insufficient in penetration to improve the ability of penetration and at the same time shift the shade toward blue, as it is desirable, thereby avoiding the undesired reddish appearance of black dyeings obtained on velvet leather by the use of known dyestuffs.

Dyestuff mixtures of this kind may also be prepared by combining a diazo-disazo compound as employed for the process of the present invention, with a mixture of (a) an end component as hitherto used (for example m-phenylene diamine, m-toluylene diamine, m-aminophenol, or a nuclear or N-substitution product of these) and (b) a 1.2- or 1.4-diamino or amino-hydroxy compound of the benzene series, the quantitative proportions of the latter coupling components used being eventually a more or less great percentage of the total of coupling components used.

The dyestuffs of the present invention deliver on leather, in general, shades which are less intense owing to their greater depth of penetration. By the use of these dyestuffs in combination with leather dyestuffs which produce deep shades on the surface but are deficient in penetration it is possible to obtain a desired good penetration together with a, likewise desired, bloomy shade of great intensity.

The following examples are given for the purpose of illustrating the invention, the temperatures being in degrees centigrade.

Example 1

To a tetrazo solution prepared from 18.4 kilograms of 4.4'-diaminodiphenyl, 43 liters of 10 N hydrochloric acid and 14 kilograms of sodium nitrite (technical grade) in the usual manner there is allowed to flow at about 10–12° a neutral solution of the sodium salt of 29.8 kilograms of 1-amino-8-naphthol-3.6-disulfonic acid. After stirring at this temperature for several hours, the mass is neutralized with anhydrous sodium acetate to such a degree only that Congo paper still shows a markedly blue coloration. The mass is stirred at this temperature for such a time until the 1-amino-8-naphthol-3.6-disulfonic acid has practically disappeared. After cooling with ice to 0° a diazo solution prepared from 7.8 kilograms of aniline in the usual manner is added. At 5–10°, an excess of a solution of sodium carbonate is allowed to run in until the reaction remains markedly alkaline. When the diazobenzene has disappeared, an aqueous solution of about 11 kilograms of 1.2-diaminobenzene is allowed to run in.

After the dyestuff formation has been completed, the dyestuff which corresponds to the formula of claim 3

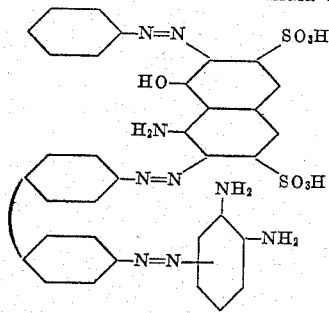

is separated by adding rock salt and neutralizing with hydrochloric acid, it is then filtered and dried. The dyestuff forms a dark, water-soluble power which dyes cotton, rayon or leather bluish black shades. The dyeings are resistant to acids. The penetration is very good. The color of solution of the dyestuff in concentrated sulfuric acid is a dark bluish violet.

When replacing the 1-amino-8-naphthol-3.6-disulfonic acid by 1-amino-8-naphthol-4.6-disulfonic acid, a dark water-soluble powder is obtained which dissolves in concentrated sulfuric acid with a dark-green color. The dyestuff dyes chrome or velvet leather greenish black shades.

If using instead of 1.2-diaminobenzene for instance 1.4-diaminobenzene, 4-chloro-1.2-diaminobenzene, 2-aminodiphenylamine, N-ethylamino-4-aminobenzene, N-dimethylamino-4-aminobenzene, N-diethylamino-4-aminobenzene, N-methylamino-, N-isopropylamino-, N-cyclohexylamino-, N-benzylamino-2- or -4-aminobenzene there are obtained products dyeing similar, bluish black shades.

Example 2

If using in Example 1, paragraph 1, instead of aniline an equivalent amount of aniline-4-sulfonic acid, a dark dyestuff powder is obtained which dissolves easily in water and in concentrated sulfuric acid with a dark bluish violet color. The dyestuff corresponds to the formula of claim 4

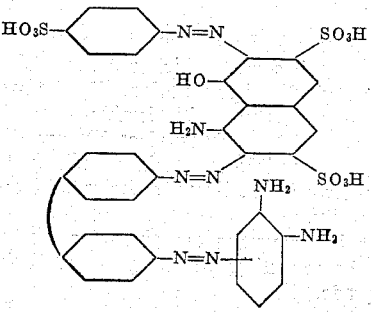

Velvet leather is dyed black-blue shades. The penetration is very good.

Dyestuffs of similar properties are obtained by using as a diazo component in place of aniline-4-sulfonic acid another aminobenzenesulfonic or -carboxylic acid or naphthylaminesulfonic acid, for example 2-amino-1-methylbenzene-4- or -5-sulfonic acid
3-amino-1-methylbenzene-4- or -6-sulfonic acid
4-amino-1-methylbenzene-2- or -3-sulfonic acid
4-acetylamino-2-aminobenzene-1-sulfonic acid
5-acetylamino-2-aminobenzene-1-sulfonic acid
4-aminophenylaminoethanesulfonic acid
2-, 3-, or 4-aminobenzoic acid
2-amino-1-methoxybenzene-4-sulfonic acid
4-amino-1-methoxybenzene-2- or -3-sulfonic acid
2-nitro-1-aminobenzene-4-sulfonic acid
4-nitro-1-aminobenzene-2-sulfonic acid furthermore cresidine-, xylidine-, chlorotoluidine-sulfonic acids
1-naphthylamino-4-, -5-, -6- or -7-sulfonic acid
2-naphthylamino-6-, -7- or -8-sulfonic acid
2-naphthylamino-4.8-disulfonic acid
2-naphthylamino-5.7-disulfonic acid
2-naphthylamino-6.8-disulfonic acid
1-naphthylamino-5.7-disulfonic acid
1-naphthylamino-4.8-disulfonic acid
1-naphthylamino-3.6- or -3.8-disulfonic acid
1-aminobenzene-4-sulfonamide
2-amino-1-methylbenzene-4-sulfonamide
4-amino-1-methylbenzene-2-sulfonamide
4-amino-1-methoxybenzene-2-sulfonamide

Example 3

If using in Example 1, paragraph 1, instead of 1.2-diaminobenzene 1-amino-2-hydroxybenzene or 1-amino-4-hydroxybenzene as a coupling component, dark dyestuff powders are obtained which dissolve well in water. The color of solution in concentrated sulfuric acid is reddish dark blue.

The products dye leathers greenish blue-black or bluish black shades. The penetration of velvet leather or leather for clothing is very good.

The final coupling may be carried out in a neutral or alkaline medium.

If employing for the final component 4-methyl-2-amino-1-hydroxy-benzene, a dyestuff is obtained which dyes leather a greenish black shade; with 4-N-methylamino-1-hydroxy-benzene a bluish black shade is obtained.

Example 4

If employing in Example 1, paragraph 1, instead of aniline an equivalent amount of 2-chloroaniline there is obtained, after separating and drying, a dark water-soluble powder. The color of solution in concentrated sulfuric acid is dark violet. On leather a dark bluish green shade is obtained. The penetration is very good.

The corresponding dyestuff in which instead of 2-chloroaniline the 2-chloroaniline-4-sulfonic acid and as an end component 2-aminophenol is used, dissolves in concentrated sulfuric acid with a dark blue color and dyes leather a dark green shade.

Instead of 2-chloroaniline one may also use 4-chloroaniline or 2-chloroaniline-4- or -5-sulfonic acid or 4-chloroaniline-2- or -3-sulfonic acid to obtain corresponding dyestuffs.

Example 5

A suspension of the diazo-disazo compound prepared according to the indications of Example 1 is combined, as soon as the diazobenzene has disappeared, with a mixture of about 0.4 kilogram of 1-amino-3-hydroxybenzene and 0.8 kilogram of 1.2-diaminobenzene.

After separating and drying, a dark water-soluble dyestuff powder is obtained which dissolves in concentrated sulfuric acid with a reddish dark blue color; it dyes velvet leather lively bluish black shades. The penetration is very good.

If using in place of aniline an equivalent amount of aniline-4-sulfonic acid and as an end component a mixture of about 0.4 kilogram of 1.2-diaminobenzene and about 0.8 kilogram of 1.3-diaminobenzene there is obtained, after separating and drying, a dark dyestuff powder which dissolves in concentrated sulfuric acid with a reddish dark blue color and dyes velvet leather full bluish black shades. The penetration is very good.

I claim:
1. Polyazo dyestuffs of the general formula

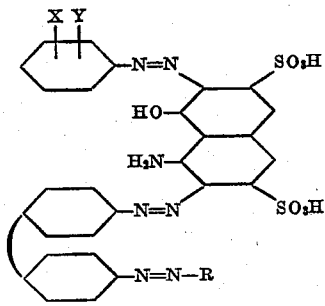

wherein X is a member selected from the group consisting of hydrogen, carboxylic and sulfonic acid groups, Y means a radical of the group consisting of hydrogen, methyl, methoxy, chlorine and nitro and R means a radical of the group consisting of ortho and para phenylene diamine.

2. Polyazo dyestuffs of the general formula

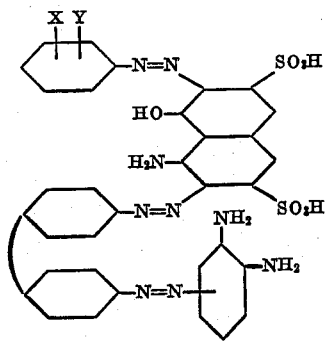

wherein X is a member selected from the group consisting of hydrogen, carboxylic and sulfonic acid groups and Y means a radical of the group consisting of hydrogen, methyl, methoxy, chlorine and nitro.

3. The polyazo dyestuff of the formula

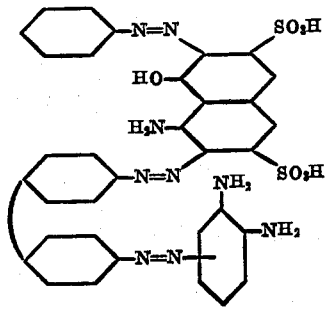

4. The polyazo dyestuff of the formula

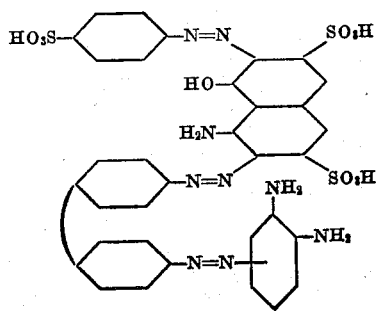

5. The polyazo dyestuff of the formula

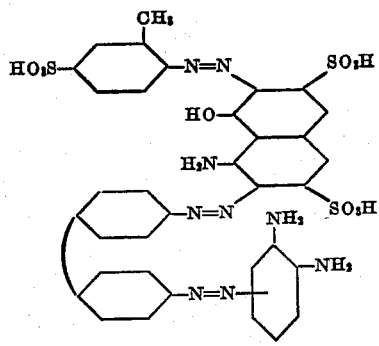

6. The polyazo dyestuff of the formula

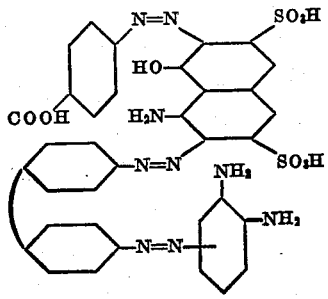

7. The polyazo dyestuff of the formula

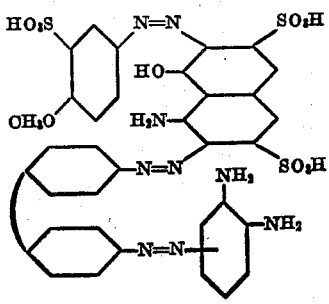

References Cited in the file of this patent
UNITED STATES PATENTS

| | | |
|---|---|---|
| 717,550 | Dedichen | Jan. 6, 1903 |
| 1,885,609 | Leemann et al. | Nov. 1, 1932 |